Patented July 24, 1934

1,967,405

UNITED STATES PATENT OFFICE 1,967,405

PROCESS OF PREPARING CELLULOSE ESTERS

Joseph F. Haskins, Kenmore, and Ferdinand Schulze, Buffalo, N. Y., assignors to Du Pont Rayon Company, New York, N. Y., a corporation of Delaware No Drawing. Application January 22, 1930, Serial No. 422,549

11 Claims. (Cl. 260—101)

This invention relates to the art of cellulose esters, and more particularly to an improved process of producing them.

In recent years cellulose esters have become very important in connection with plastics, lacquers, threads, filaments, films and similar products, and a large number of processes have been suggested for preparing them. These include two general classes of reaction. In the first, the reaction medium is an acid or is acidic in nature. Since cellulose nitrate and cellulose acetate have always been prepared commercially by the acid method, we have come to think of esterification of cellulose in terms of acetylation and nitration whereas these are merely rather special types of esterification, and but few other cellulose esters, namely the propionate and the butyrate, have been prepared by the action of the acid and the anhydride of the same acid, plus a catalyst, on cellulose. Furthermore, it seems impossible to prepare esters of cellulose by any of the acid esterifications without degradation of the cellulose, because strong organic or inorganic acids or substances which liberate these acids on hydrolysis or dissociation, must be used as catalysts, and these readily decompose the cellulose.

In the second method the reaction is carried out in a basic medium. Cross and Bevan made the first use of one type of this method when they prepared cellulose benzoate from alkali cellulose and benzoyl chloride, and when they prepared the sodium salt of cellulose dithio carbonate (cellulose xanthate) by the action of carbon bisulfide (the anhydride of dithio carbonic acid) upon alkali cellulose. This basic process has found commercial application in the viscose process just as the acid method has found use in cellulose acetate production. Using the reaction of an acid chloride on alkali cellulose, however, but few cellulose esters in addition to the benzoate and the para-toluene sulfonate have been prepared.

A much more general method for esterification is the action of an acid chloride on cellulose in the presence of a tertiary amine, commonly pyridine. This method is very economical of material, can be utilized for a very large number of cellulose esters, produces a very complete esterification, runs in a smooth manner which is capable of good control and, most important of all, the resulting cellulose esters are substantially undegraded. Such esters as the laurate, palmitate and stearate are commonly made by this method.

With acid anhydrides the use of a basic medium has not been as satisfactory, however, due to the fact that the reaction takes place incompletely or with extreme slowness. Using this method, Hess (Ber. 61B, 1460–1462) (1928) prepared what was apparently the triacetate of pure cellulose by the action of acetic anhydride on cellulose in the presence of pyridine. His product was insoluble in the usual triacetate solvents, though greatly swelled by them, which he explained on the assumption that the cellulose had not been degraded. Since this method requires several weeks to complete the reaction, however, anhydrides have not gone into general use.

Our invention resides in a process of speeding up these esterifications in basic media without losing any of the advantages of the process.

We have discovered that if an ammonium or amine salt of a halogen acid is added to the system the following advantages are gained: First, the speed of esterification is greatly increased, which permits using lower temperatures or shorter lengths of time, or both, and these milder conditions have a less detrimental effect on the cellulose, yielding cellulose esters of higher quality than are obtainable otherwise. Second, the use of amine salts of halogen acids frequently accomplishes esterification with smaller amounts of acid anhydride and hence at reduced cost. Third, by regulating reaction temperature, reaction time, or concentration of amine salts in the reaction mixture the properties of the resulting cellulose ester may be varied between rather wide limits. For example, mild operating conditions give fully esterified cellulose esters which are practically insoluble in most solvents, while by increasing temperature, time or amount of the amine salt it is possible to obtain soluble products. Furthermore, by regulating these conditions it is possible to vary the viscosity of the resultant cellulose derivative.

It is therefore an object of this invention to provide a process of preparing cellulose esters. It is a further object of this invention to provide a process of preparing cellulose esters of better quality than those heretofore available.

With the above and other objects in view, which will be apparent as the description proceeds, we have set forth our invention in the following specification and have included the following examples by way of illustration and not as a limitation.

*Example 1*

To 1 part by weight of cotton linters pulp is added a solution of 4 parts by weight of pyridine hydrochloride in 29 parts by weight of pyridine, and 3.8 parts by weight of acetic anhydride. The mixture is placed in a flask connected to a stirring device and a reflux condenser and heated in a bath kept at 115° to 120° C. until a sample taken from the reaction vessel, coagulated in water or alcohol, washed and dried, proves to be soluble in chloroform. This requires 6 to 10 hours. The reaction mixture is then poured slowly, with stirring, into water or alcohol, where it coagulates. The coagulated material is washed well with water, extracted with alcohol and dried. The product both from yield and acetyl value corresponds to a triacetate and is soluble in chloroform, giving a viscous solution.

*Example 2*

To 1 part by weight of cotton linters pulp is added 5 parts by weight of pyridine hydrochloride, 24 parts by weight of pyridine, and 4 parts by weight of propionic anhydride. The mixture is heated, with stirring at such a temperature that slow refluxing takes place (i. e., at about 115° to 120° C.) until a sample taken out, coagulated, washed with water, extracted with alcohol and dried proves to be soluble in chloroform. This requires about 17 hours. The solution is poured slowly, with stirring, into water or alcohol, and the coagulated material is washed with water, extracted with alcohol and dried. The product is soluble in chloroform, and corresponds on anaylsis to a cellulose tripropionate.

*Example 3*

1 part by weight of cotton linters pulp is mixed with 4 parts by weight of pyridine hydrochloride, 10 parts by weight of pyridine, and 9 parts by weight of butyric anhydride. The mixture is heated, with stirring, at such a temperature that slow refluxing takes place (i. e., at about 115° to 120° C.) until a sample taken out, coagulated in 50% alcohol and washed with cold 50% alcohol proves to be soluble in chloroform. This requires 4–6 hours. The solution is then poured slowly, with stirring, into 50% alcohol, extracted with cold alcohol and dried. The product corresponds on analysis to a tributyrate.

*Example 4*

Into 14 parts by weight of pyridine are passed 1½ parts by weight of dry hydrogen chloride. To this is added 1 part by weight of cotton linters pulp and 12 parts by weight of benzoic anhydride. The mixture is heated at such a temperature that slow refluxing takes place (i. e., at about 115° to 120° C.), with stirring, until the product, after coagulation, washing and drying a small sample, proves to be soluble in chloroform. This requires about 16–18 hours. The solution is poured into alcohol, extracted with alcohol and dried. The product is a powder, soluble in chloroform or benzene, and analysis shows it to be a tribenzoate.

*Example 5*

1 part by weight of cellulose is mixed with 4 parts by weight of pyridine hydrochloride, 1 part by weight of pyridine, 10 parts by weight of chlorobenzene and 10 parts by weight of butyric anhydride. The mixture is heated at such a temperature that slow refluxing takes place (i. e. about 132° C.) for 5½ hours, then steam distilled. The residue is extracted with alcohol and then washed with water and dried. The product is soluble in chloroform and corresponds to a cellulose tributyrate.

*Example 6*

1 part by weight of cellulose is mixed with 6 parts by weight of pyridine hydrochloride, 25 parts by weight of pyridine, and 10 parts by weight of acetic anhydride. The mixture is warmed at 65°–70° C. for 8 hours, the solution coagulated in water, extracted with alcohol and dried. The product, both from yield and analysis, corresponds to the triacetate. It is insoluble in any of the usual solvents though greatly swollen by chloroform.

*Example 7*

1 mole (162 grams) of dried cellulose, three moles (444 grams) phthalic anhydride, 3 moles (347 grams) of pyridine hydrochloride, and 450 grams of pyridine are heated at 80–100° C. for from 1 to 2 hours. The resulting product retains the fibrous structure of the original cellulose, is insoluble in, but partially swollen by, 5% ammonium hydroxide solution, and contains at least two phthalate groups per $C_6H_{10}O_5$ group. A product which is completely soluble in 5% ammonium hydroxide solution may be obtained by heating the reaction mixture for 24 hours at 80° C., for 8 hours at 100° C., or for 3 hours at 120° C. The solutions in each of these cases have a very high viscosity, but this may be reduced by continuing the reaction for longer periods. The higher the temperature the shorter will be the time required to bring the material to the soluble state or to reduce its viscosity, but we prefer a temperature of 100° C. as it is high enough to maintain a modifying action of pyridine hydrochloride at a proper rate, and still not high enough to bring about darkening of the product. The resulting cellulose hydrogen phthalate is separated by dissolving the reaction product in sufficient water to give a solution of low viscosity, filtering and pouring in a thin stream into dilute sulfuric acid. The cellulose hydrogen phthalate precipitates out and is filtered and washed with warm water and dried. The product obtained by any of the modifications indicated in this example contains slightly over two phthalate groups to one $C_6H_{10}O_5$ group as shown by analysis.

Although the above examples disclose the use of cellulose broadly and the use of cotton linters pulp, it is obvious that other sources of cellulose, such as sulfite wood pulp or cotton hull fibers, may also be used. While we prefer to use a substantially undegraded cellulose, such as cotton linters, without any treatment or degradation, for special purposes it may be desirable to partially degrade the cellulose or to use hydrocellulose or oxycellulose and the invention contemplates such use. We may also use any of the lower esters or ethers of cellulose, such as monoethyl ether of cellulose, in which cases we secure mixed esters or ether-esters. In short, by cellulose, as used in this specification to refer to the raw material, is meant cellulose which has been substantially freed from contaminating substances and which is either in the pure form or in the form of a degraded or substituted cellulose which still has reactive OH groups.

The above examples have been limited to the production of cellulose triacetate, cellulose tripropionate, cellulose tributyrate, cellulose tribenzoate and cellulose hydrogen phthalate, but we desire to have it understood that our process is also applicable to the production of cellulose esters generally, including the stearate and palmitate.

It should also be understood that our process is not limited to the production of completely esterified cellulose but may also be used in reactions which lead to the introduction of less than three acid radicals, for instance one or two, per $C_6H_{10}O_5$ group.

In the above examples pyridine hydrochloride has been used as the amine salt of a halogen acid because it has the highest catalytic activity, as well as being one of the cheapest and most easily prepared of these salts, but many other ammonium or amine salts may be used as catalysts in the carrying out of our invention, among which we mention the following, which we have found to exercise a catalytic action: pyridine hydrobromide, ammonium chloride, dimethyl amine hydrochloride, tetraethyl ammonium bromide, dimethylaniline hydrochloride, and the alkyl pyridinium halides, such as ethyl pyridinium bromide and benzyl pyridinium chloride.

While pyridine has been referred to as the basic medium, it is understood that our process can be operated with other tertiary ammonia bases, such as homologues of pyridine.

Our products may be used as they are produced according to this invention in the preparation of films, threads, filaments, plastics, lacquers and any other use to which cellulose esters are usually applied. Furthermore, where a different solubility is used, we may treat our cellulose esters with various materials to alter their solubility.

In an application filed of even date herewith in the name of Ferdinand Schulze No. 422,548 there is disclosed a process of making dicarboxylic acid esters of cellulose, by treating a cellulose material containing a free hydroxyl group with the anhydride of a dicarboxylic acid in the presence of a tertiary amine, that has particular reference to the carrying out of the reaction without the aid of a catalyst. As indicated in Example 7 of the present application, however, we have found that such reactions can be speeded up by the use of a catalyst, hence the claims of this application are intended to cover the production of esters of both monobasic and dibasic acids, unless these are specifically excluded.

It will therefore be apparent that we have produced a new and useful process of making cellulose esters which yields cellulose esters of higher quality, that it can be carried out with rapidity, with lower temperatures and frequently with smaller amounts of acid anhydride, and that the temperature, time and concentration of amine salts may be varied to control the solubility, viscosity and purity of the resulting cellulose derivative.

As many apparently widely different embodiments of this invention may be made without departing from the spirit and scope thereof, it is to be understood that we do not limit ourselves to the specific embodiments thereof except as defined in the appended patent claims.

We claim:

1. The process of making cellulose esters, which comprises heating cellulose with an organic acid anhydride and a tertiary amine base in the presence of one of a group of compounds consisting of ammonium and amine salts of halogen acids.

2. The process of claim 1 in which the said salt is a salt of hydrochloric acid.

3. The process of claim 1, in which the tertiary amine base is pyridine.

4. The process of claim 1, in which the amine salt is pyridine hydrochloride.

5. The process of claim 1 in which the salt is an amine salt of a halogen acid.

6. The process of claim 1 in which the salt is the ammonium salt of a halogen acid.

7. The process of claim 1 in which the said salt is the pyridine salt.

8. The process of claim 1, in which the heating is carried out at from 65 to 120° C.

9. The process of claim 1, in which the reaction is continued for from 1 to 18 hours.

10. The process of making cellulose acetate, which comprises heating cellulose with acetic anhydride and pyridine in the presence of pyridine hydrochloride at a temperature of from 65 to 120° C. for from 1 to 18 hours.

11. The method of making cellulose acetate with economy of time and of esterifying reagents which comprises heating cellulose with acetic anhydride and pyridine in the presence of a tertiary amine salt of a halogen acid at a temperature of from about 65° to about 120° C.

JOSEPH F. HASKINS.
FERDINAND SCHULZE.